Patented July 23, 1940

2,208,565

UNITED STATES PATENT OFFICE 2,208,565

PLASTER RETARDER

Carlisle K. Roos, Wheaton, and Harry N. Huntzicker, Evanston, Ill., assignors to United States Gypsum Company, Chicago, Ill., a corporation of Illinois No Drawing. Application January 6, 1938, Serial No. 183,622

10 Claims. (Cl. 106—34)

This invention relates to a retarder and more particularly to a plaster setting retarder, and has for an object the provision of a material that will tend to inhibit the setting of calcined gypsum plaster.

In the art dealing with cements, limes, and plasters it has become common practice to modify the setting time of these materials, particularly calcined plasters, by incorporating therewith certain organic materials which inhibit the setting of the material so that it will set more slowly than it would if the retarder were omitted. The usual types of retarder used for this purpose have been partially hydrolyzed animal proteins obtained by treating various types of animal matter or refuse with a hydrolyzing agent, whereupon the resulting product has been mixed with a carrying medium or extender which in many cases has consisted of ordinary lime. It has generally been believed that an effective retarder can be made only from proteins of animal origin and particularly from proteins containing an appreciable amount of sulfur in the molecule, such, for example, as cystine present in keratin. Hair, hoofs and horn are the common raw materials containing keratin which are employed for this purpose. It has been realized for some time that certain other animal proteins, such as gelatin and glue, also assert an inhibiting or retarding effect upon the setting rate of calcined gypsum plasters.

A further object of the invention is to produce a plaster retarder which has an efficiency comparable to that of degraded animal proteins and which may be generally employed in commercial calcined gypsum plaster without interfering with the strength of the ultimate product or the ease of incorporation of the retarder.

An extensive source of protein material which has not been utilized in industry to any great extent is to be found in the so-called distillery slops which are waste products of the fermentation industries. A number of organic compounds are produced industrially by the fermentive action of microorganisms on certain organic materials in aqueous media. The most extensive commercial fermentations carried on industrially at the present time are the fermentation of grain, hydrol or molasses mashes to produce ethyl alcohol or butyl alcohol and acetone or isopropyl alcohol. Such fermentations are carried out by yeasts or bacteria of the type Clostridium butylicum. Suitable mashes are prepared containing from about 2% to 10% carbohydrate material from grains, waste molasses, or other suitable carbohydrate-containing substances according to well-known methods in the fermentation art. The carbohydrate material present is nearly completely fermented by the microorganisms employed for the fermentation to produce the desired products such as certain gases, organic acids, alcohols, ketones, etc. These materials may be removed from the fermented mash, usually by distillation or other suitable methods, and the dilute mash residue is the so-called distillery slop.

Distillery slop contains a large variety of organic and inorganic materials, and its composition depends largely upon the composition of the mash originally fermented, the microorganisms employed for the fermentation, the treatment of the mash before and after fermentation, and the conditions under which the fermentation was carried out. It usually contains from about 0.2% to about 5% of solid material. The solid material consists of both soluble and insoluble organic and inorganic substances. The carbohydrate has been largely fermented away, and the remaining organic material comprises a large amount of proteins and other organic nitrogenous compounds. The nitrogenous compounds originate from the material originally employed to make up the mash and from the synthetic activities of the microorganisms. Some distillery slops contain soluble and degraded proteins which may have resulted either from the presence of the degraded materials within the original mash or from the proteolytic activities of certain microorganisms that were employed for the fermentation. For example, distillery slop resulting from the ethyl alcohol fermentation of grains by yeasts (grain ethyl slop) usually contains a considerable amount of insoluble protein material and only a relatively small amount of soluble organic nitrogenous compounds, since the yeast does not proteolyze the original protein material of the grain. On the other hand, distillery slop resulting from the butyl alcohol-acetone fermentation of grains by bacteria of the type Clostridium acetobutylicum (grain butyl slop) will usually contain a considerable amount of degraded protein material. The organism Clostridium acetobutylicum proteolyzes the grain protein by enzymatic action during the fermentation, and thus appreciable amounts of soluble nitrogenous matter are present in grain butyl slops. Molasses mashes in general contain many unidentified nitrogenous compounds, a large portion of which may be altered to insoluble protein-like substances or to other soluble nitrogenous compounds by the action of either bacteria or yeasts. Other substances commonly found in distillery slops are organic and inorganic salts, organic acids, fibrous materials, small amounts of fatty oils, etc.

Distillery slop, for the purpose of the herein described invention, may also be obtained from other fermentation processes such as the butyric acid, the propionic acid, the 2-3 butylene glycol fermentation, the lactic acid fermentation of cellulosic materials, or from the waste material discharged in the manufacture of yeast or beer.

Distillery slop has been used to some extent in the past for cattle feed and fertilizer. Enormous quantities of this material are produced daily by large distillers, and often a serious problem is presented as to how to dispose of the waste because of the nuisance created by discharging it into rivers or lakes. Further uses for this material are being thoroughly investigated by many of the large distillers at the present time.

The slop in its unconcentrated state is known in the art as thin slop. Thin slop may be concentrated to any desired degree by evaporation or centrifuging, or the water may be entirely removed, whereby a dry product results.

It has been found that distillery slops may be very effectively substituted for degraded animal proteins in plaster retarders. They may be readily incorporated into the plaster, and they are cheaper and more readily available in large quantities than hydrolyzed animal proteins. Animal proteins usually must be strongly hydrolyzed by means of alkali or enzymes before they can be used; but distillery slops, if desired, may be used directly without special hydrolysis of the protein contained therein.

Before the slop is incorporated into the plaster as hereinafter described, it may be subjected to various treatments wherein the protein of the slop is modified or degraded. If desired, the slop may be treated with strong alkali such as calcium or sodium hydroxide and with or without heat and pressure in order to solubilize, hydrolyze or modify certain of the nitrogenous material contained therein. The modification may also be carried on by means of certain proteolytic enzymes such as pepsin or trypsin or, if desired, by the action of certain proteolytic bacteria under suitable conditions well recognized by those skilled in the art. Previous to the hydrolytic or protein degradation treatments it may be desirable to concentrate the slop somewhat. This however is not necessary. It is recognized, as has been previously indicated, that distillery slop from one source may vary considerably from that obtained from another source. For example, the solids of grain butyl slop or molasses slop will usually contain greater proportions of soluble degraded nitrogenous compounds than will grain ethyl slop. The degree of treatment of the slops to produce a retarder of given characteristics may be determined by simple experimentation and may vary, depending largely upon the particular type of slop employed.

The slop, modified or unmodified, thin or concentrated, may be incorporated into the plaster material at any time before the setting of the plaster. It may be incorporated in suitable amounts directly into the gauging water that is used to mix the plaster. It may also be added to the calcined gypsum in the dry condition at any time before use, either alone or with some other material which acts as an inert extender or carrier. Suitable carriers are hydrated lime, diatomaceous earth, and the like. The dried slop is preferably finely comminuted, either with or without the extender, before introduction into the calcined gypsum. The amounts of the slop added to the plaster may vary considerably, depending largely upon the type of slop employed, its preliminary treatment, and the setting properties desired in the plaster into which it is incorporated. Suitable concentrations are about 0.01% to 1.0% based on the dry weight of the slop and the calcined gypsum plaster present. Increased amounts of retarder usually increase the time of setting of the plaster. If an extender is used to carry the retarder, the extender may be incorporated into the calcined plaster in any desired amount, suitably up to 60.0%.

In carrying out this invention in one form a retarder may be prepared as follows: 400 parts by weight of concentrated grain ethyl slop containing 100 parts of dry organic matter are hydrolyzed in the presence of 20 parts of sodium hydroxide at 190° F. for 3 hours. 125 parts by weight of quicklime are added to the resulting hydrolyzate while stirring the latter. The water is partly absorbed by the quicklime to produce calcium hydrate, and the remainder is expelled from the resulting mixture by the heat of reaction of the water with the quicklime, and by subsequent drying. The final product is a dry mass of calcium hydrate into which the solid material from the modified distillery slop has been thoroughly incorporated. The resulting product is comminuted to a finely pulverulent state and thoroughly incorporated into calcined gypsum plasters in amounts of about 5 pounds per ton of gypsum. The presence of this retarder in the amount specified increased the setting time of plaster prepared from the gypsum from about twenty minutes to about one and one-half hours.

As an alternative, molasses butyl slop may be employed in an analogous manner.

The example given in the foregoing is merely illustrative of a manner in which the retarding agent of this invention may be prepared and employed, and it is not contemplated that the invention should in any way be limited thereby. The distillery slop may be modified by other substances such as acids or salts in order to degrade the proteins therein if so desired. Due to the small amounts of slop that are used as the retarder, it is usually unnecessary to remove the fibrous material contained therein. This may be desirable in certain instances however, particularly where grain slop is to be added directly to the gauging water. The fibers may be removed in any desired manner, such as by screening.

When any of the well-known retarders are added in the dry condition to calcined gypsum and stored over a period of time, it has been noted that the retarder appears to become more active, and the setting time of the plaster made from such gypsum will increase as the gypsum ages. It has been discovered that in order to stabilize the gypsum in this respect, soap may be incorporated into the plaster in small amounts with the retarder. This has been fully disclosed in co-pending application Serial No. 168,936, filed August 14, 1937, by Nicholas S. Yanick. The action of the soap is not fully understood. The solids of certain distillery slops, particularly grain ethyl slop, contain a high percentage of vegetable oils which may be converted by alkaline materials into soaps. Thus, in certain cases, a stabilized retarder is prepared directly from the slop by the alkaline treatment thereof or by the use of lime as an extender for the retarder.

While a particular embodiment of this invention is shown above, it will be understood, of course, that the invention is not to be limited thereto, since many modifications may be made; and it is contemplated, therefore, to cover any such modifications as fall within the true spirit and scope of this invention as defined by the appended claims.

We claim:

1. A dry composition of matter comprising calcined gypsum and the solid material of dried distillery slop.

2. A dry composition of matter comprising calcined gypsum and the water soluble nitrogenous compounds present in distillery slop.

3. A dry composition of matter comprising calcined gypsum and the water soluble nitrogenous compounds obtained by degradation of the proteins present in distillery slop.

4. A dry composition of matter comprising calcined gypsum, the alkali-modified nitrogenous compounds of distillery slop and an extender therefor.

5. The process of controlling the setting time of a gypsum plaster which comprises admixing therewith distillery slop.

6. The process of controlling the setting time of a gypsum plaster which comprises admixing therewith the hydrolyzed proteins of distillery slop.

7. The process of producing a retarder for plasters and the like which comprises incorporating distillery slop with an extender and drying the resulting mixture.

8. The process of producing a retarder for plasters and the like which comprises incorporating concentrated distillery slop with an extender and drying the resulting mixture.

9. The process of producing a retarder for plasters and the like which comprises hydrolyzing the nitrogenous materials present in distillery slop with alkali, incorporating the hydrolyzate with an extender and drying the resulting mixture.

10. A dry composition of matter comprising calcined gypsum and from 0.01 to 1.0 per cent of a solid material derived from dried distillery slop.

CARLISLE K. ROOS.
HARRY N. HUNTZICKER.